(12) United States Patent
Bremer et al.

(10) Patent No.: US 8,978,983 B2
(45) Date of Patent: Mar. 17, 2015

(54) INDICIA READING APPARATUS HAVING SEQUENTIAL ROW EXPOSURE TERMINATION TIMES

(75) Inventors: Edward C. Bremer, Victor, NY (US); Ryan Kather, Cicero, NY (US)

(73) Assignee: Honeywell International, Inc., Fort Mill, SC (US)

( * ) Notice: Subject to any disclaimer, the term of this patent is extended or adjusted under 35 U.S.C. 154(b) by 27 days.

(21) Appl. No.: 13/486,510

(22) Filed: Jun. 1, 2012

(65) Prior Publication Data

US 2013/0320092 A1 Dec. 5, 2013

(51) Int. Cl.
*G06K 7/10* (2006.01)

(52) U.S. Cl.
USPC ............... 235/462.32; 235/455; 235/462.42

(58) Field of Classification Search
CPC ............... G06K 2207/1018; G06K 7/10584; G06K 7/10752
USPC .......... 235/454, 455, 462.32, 462.42, 462.06, 235/462.41
See application file for complete search history.

(56) References Cited

U.S. PATENT DOCUMENTS

| | | | |
|---|---|---|---|
| 5,513,264 A | 4/1996 | Wang et al. | |
| 5,521,366 A | 5/1996 | Wang et al. | |
| 5,572,006 A | 11/1996 | Wang et al. | |
| 5,646,390 A | 7/1997 | Wang et al. | |
| 5,659,167 A | 8/1997 | Wang et al. | |
| 5,691,773 A | 11/1997 | Wang et al. | |
| 5,702,059 A * | 12/1997 | Chu et al. | 235/472.01 |
| 5,703,349 A | 12/1997 | Meyerson et al. | |
| 5,739,518 A | 4/1998 | Wang | |
| 5,763,864 A | 6/1998 | O'Hagan et al. | |
| 5,783,811 A * | 7/1998 | Feng et al. | 235/462.42 |
| 5,793,033 A * | 8/1998 | Feng et al. | 235/472.01 |
| 5,811,774 A * | 9/1998 | Ju et al. | 235/455 |
| 5,811,784 A | 9/1998 | Tausch et al. | |
| 5,815,200 A | 9/1998 | Ju et al. | |
| 5,818,028 A | 10/1998 | Meyerson et al. | |
| 5,917,913 A | 6/1999 | Wang | |
| 5,920,061 A * | 7/1999 | Feng | 235/472.01 |
| 5,979,763 A | 11/1999 | Wang et al. | |
| 6,019,286 A * | 2/2000 | Li et al. | 235/454 |
| 7,083,098 B2 * | 8/2006 | Joseph et al. | 235/454 |
| 7,089,214 B2 | 8/2006 | Wang | |
| 7,107,246 B2 | 9/2006 | Wang | |
| 7,364,081 B2 | 4/2008 | Havens et al. | |
| 7,568,628 B2 | 8/2009 | Wang et al. | |
| 7,611,060 B2 | 11/2009 | Wang et al. | |
| 7,635,084 B2 | 12/2009 | Wang et al. | |
| 7,699,227 B2 | 4/2010 | Wang et al. | |
| 7,726,575 B2 | 6/2010 | Wang et al. | |
| 7,740,176 B2 | 6/2010 | Wang et al. | |
| 7,770,799 B2 | 8/2010 | Wang | |

(Continued)

*Primary Examiner* — Paultep Savusdiphol
(74) *Attorney, Agent, or Firm* — Additon, Higgins & Pendleton, PA.

(57) ABSTRACT

There is set forth herein an indicia reading apparatus having an image sensor array including a plurality of pixels arranged in a plurality of rows and columns of pixels. The image sensor array can include a frame exposure period in which a certain subsequent and further subsequent row exposure periods have common exposure initiation times and sequential exposure termination times. An indicia reading apparatus can be controlled so that a light source bank of an illumination pattern assembly for projecting an illumination pattern is energized during an illumination period that overlaps a frame exposure period. The apparatus can be further controlled so that an illumination period terminates at or prior to an exposure termination time of the certain row.

20 Claims, 4 Drawing Sheets

(56) References Cited

U.S. PATENT DOCUMENTS

| | | |
|---|---|---|
| 7,780,089 B2 | 8/2010 | Wang |
| 7,784,696 B2 | 8/2010 | Wang |
| 7,813,047 B2 | 10/2010 | Wang et al. |
| 7,909,257 B2 * | 3/2011 | Wang et al. ............. 235/462.45 |
| 7,918,398 B2 | 4/2011 | Li et al. |
| 7,984,855 B2 | 7/2011 | Wang |
| 8,002,188 B2 | 8/2011 | Wang |
| 8,011,584 B2 * | 9/2011 | Powell et al. ................. 235/455 |
| 8,025,232 B2 | 9/2011 | Wang |
| 8,027,096 B2 | 9/2011 | Feng et al. |
| 8,083,148 B2 | 12/2011 | Wang et al. |
| 8,091,788 B2 * | 1/2012 | Olmstead ................. 235/462.41 |
| 8,146,820 B2 | 4/2012 | Wang et al. |
| 8,162,218 B2 * | 4/2012 | Meier et al. ................... 235/454 |
| 8,336,778 B2 * | 12/2012 | Powell et al. ................. 235/455 |
| 8,408,464 B2 * | 4/2013 | Zhu et al. ....................... 235/454 |
| 8,448,862 B2 * | 5/2013 | Powell et al. ................. 235/455 |
| 2005/0145698 A1 | 7/2005 | Havens et al. |
| 2006/0043185 A1 * | 3/2006 | Joseph et al. ................. 235/455 |
| 2006/0202036 A1 | 9/2006 | Wang et al. |
| 2006/0202038 A1 | 9/2006 | Wang et al. |
| 2006/0274171 A1 | 12/2006 | Wang |
| 2006/0283952 A1 | 12/2006 | Wang |
| 2007/0040034 A1 * | 2/2007 | Hennick et al. .......... 235/462.41 |
| 2007/0063048 A1 | 3/2007 | Havens et al. |
| 2007/0089168 A1 | 4/2007 | Wang et al. |
| 2007/0156021 A1 | 7/2007 | Morse et al. |
| 2007/0164111 A1 | 7/2007 | Wang et al. |
| 2007/0267501 A1 | 11/2007 | Jovanovski et al. |
| 2007/0284448 A1 | 12/2007 | Wang |
| 2007/0285698 A1 | 12/2007 | Wang et al. |
| 2008/0144185 A1 | 6/2008 | Wang et al. |
| 2008/0144186 A1 | 6/2008 | Feng et al. |
| 2008/0169347 A1 * | 7/2008 | Olmstead ................. 235/462.41 |
| 2008/0296393 A1 | 12/2008 | Jovanovski et al. |
| 2009/0026267 A1 | 1/2009 | Wang et al. |
| 2009/0039167 A1 | 2/2009 | Wang et al. |
| 2009/0044003 A1 | 2/2009 | Berthiaume et al. |
| 2009/0072034 A1 * | 3/2009 | Meier et al. .............. 235/462.07 |
| 2009/0072038 A1 | 3/2009 | Li et al. |
| 2010/0044436 A1 * | 2/2010 | Powell et al. .................. 235/455 |
| 2010/0044440 A1 | 2/2010 | Wang et al. |
| 2010/0078477 A1 | 4/2010 | Wang et al. |
| 2010/0090007 A1 * | 4/2010 | Wang et al. .............. 235/462.11 |
| 2010/0108769 A1 | 5/2010 | Wang et al. |
| 2010/0133345 A1 | 6/2010 | Havens et al. |
| 2010/0147948 A1 * | 6/2010 | Powell et al. .................. 235/455 |
| 2010/0147956 A1 | 6/2010 | Wang et al. |
| 2010/0258633 A1 | 10/2010 | Wang et al. |
| 2010/0259638 A1 | 10/2010 | Wang |
| 2010/0276491 A1 | 11/2010 | Havens et al. |
| 2010/0276492 A1 | 11/2010 | Wang et al. |
| 2010/0289915 A1 | 11/2010 | Wang |
| 2010/0315536 A1 | 12/2010 | Wang |
| 2010/0316291 A1 | 12/2010 | Deng et al. |
| 2011/0004557 A1 | 1/2011 | Ding et al. |
| 2011/0017829 A1 | 1/2011 | Wang et al. |
| 2011/0036910 A1 | 2/2011 | Bremer et al. |
| 2011/0038563 A1 | 2/2011 | Bremer et al. |
| 2011/0049245 A1 | 3/2011 | Wang |
| 2011/0057039 A1 | 3/2011 | Wang |
| 2011/0080500 A1 | 4/2011 | Wang et al. |
| 2011/0089245 A1 | 4/2011 | Havens et al. |
| 2011/0163165 A1 | 7/2011 | Liu et al. |
| 2011/0163166 A1 | 7/2011 | Wang et al. |
| 2011/0174880 A1 | 7/2011 | Li et al. |
| 2011/0284637 A1 * | 11/2011 | Powell et al. .................. 235/455 |
| 2011/0290887 A1 | 12/2011 | Wang et al. |
| 2011/0303750 A1 | 12/2011 | Wang |
| 2012/0002066 A1 | 1/2012 | Wang |
| 2012/0012656 A1 | 1/2012 | Wang |
| 2012/0031977 A1 | 2/2012 | Havens et al. |
| 2012/0075076 A1 | 3/2012 | Wang |
| 2012/0199654 A1 * | 8/2012 | Zhu et al. ....................... 235/455 |

\* cited by examiner

INDICIA READING APPARATUS HAVING SEQUENTIAL ROW EXPOSURE TERMINATION TIMES

FIELD OF THE INVENTION

The present invention relates in general to optical based registers, and particularly is related to an image sensor based indicia reading apparatus.

BACKGROUND OF THE INVENTION

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available. Keyboards and display equipped indicia reading apparatus are commonly used in shipping and warehouse applications, and are available in form factors incorporating a display and keyboard. In a keyboard and display equipped indicia reading apparatus, a trigger button for actuating the output of decoded messages is typically provided in such locations as to enable actuation by a thumb of an operator. Indicia reading apparatus in a form devoid of a keyboard and display or in a keyboard and display equipped form are commonly used in a variety of data collection applications including point of sale applications, shipping applications, warehousing applications, security check point applications, and patient care applications.

Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters.

SUMMARY OF THE INVENTION

There is set forth herein an indicia reading apparatus having an image sensor array including a plurality of pixels arranged in a plurality of rows and columns of pixels. The image sensor array can include a frame exposure period in which a certain subsequent and further subsequent row exposure periods have common exposure initiation times and sequential exposure termination times. An indicia reading apparatus can be controlled so that a light source bank of an illumination pattern assembly for projecting an illumination pattern is energized during an illumination period that overlaps a frame exposure period. The apparatus can be further controlled so that an illumination period terminates at or prior to an exposure termination time of the certain row.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is set forth herein an indicia reading apparatus 1000 having an image sensor array including a plurality of pixels arranged in a plurality of rows and columns of pixels. The image sensor array can include a frame exposure period in which a certain subsequent and further subsequent row exposure periods have common exposure initiation times and sequential exposure termination times. An indicia reading apparatus can be controlled so that a light source bank of an illumination assembly for projecting an illumination pattern is energized during an illumination period that overlaps a frame exposure period. The apparatus can be further controlled so that an illumination period terminates at or prior to an exposure termination time of the certain row.

Configured or described, the apparatus allows for use of a low cost high resolution image sensor integrated circuit and operative with significantly increased motion tolerance, resulting in improved image quality of captured frames of image data substantially free of motion blur.

Figure 1:
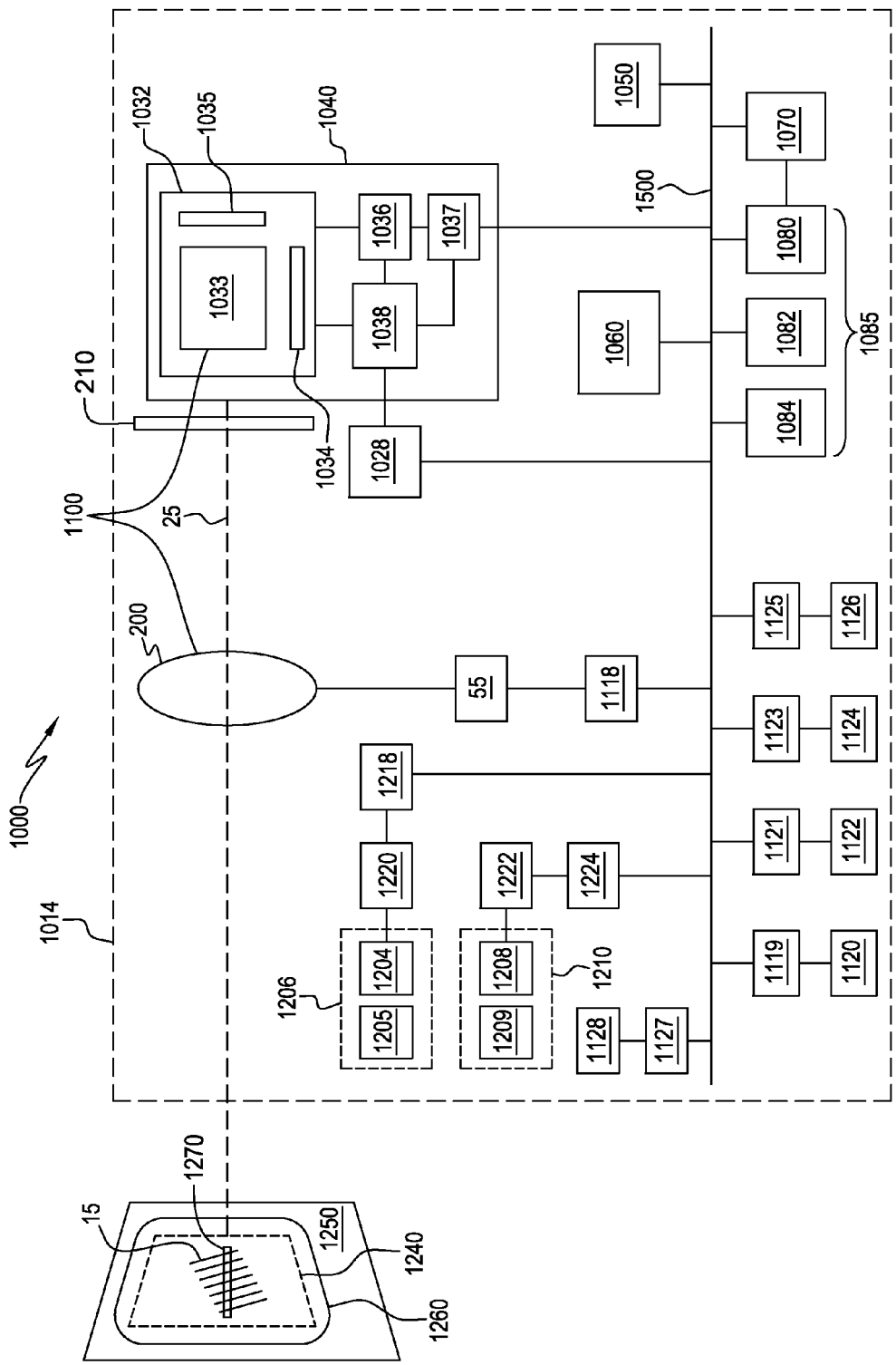
FIG. 1 is a block design illustrating an exemplary imaging apparatus.

An exemplary hardware platform for support of operations described herein with reference to an image sensor based indicia reading apparatus is shown and described with reference to FIG. 1.

Indicia reading apparatus 1000 can include an image sensor 1032 comprising a multiple pixel image sensor array 1033 having pixels arranged in rows and columns of pixels, associated column circuitry 1034 and row circuitry 1035. Associated with the image sensor 1032, can be amplifier circuitry 1036 and an analog to digital converter 1037. Analog to digital converter 1037 converts image information in the form of analog signals read out of image sensor array 1033 into image information in the form of digital signals. Image sensor 1032 can also have an associated timing and control circuit 1038 for use in controlling, for e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an Aptina MT9P031 image sensor integrated circuit available from Aptina Imaging Corporation of San Jose, Calif. The noted image sensor integrated circuit from Aptina includes a global reset release function which when activated results in an exposure period for a plurality of rows being initiated at a common time with the exposure period termination times for the plurality of rows being sequential. Image sensor integrated circuit 1040 can incorporate a Bayer pattern filter. In such an embodiment, CPU 1060 prior to subjecting a frame to further processing can interpolate pixel values intermediate of a certain channel of pixel values, (e.g., red, green, or blue) pixel values at pixel positions of the single channel (e.g., red, green, blue) for development of a monochrome frame of image data.

In the course of operation of apparatus 1000, image signals can be read out of image sensor 1032, converted and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access (DMA) unit 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, lens assembly 200 can be adapted for focusing an image of a decodable indicia 15 located within a field of view 1240 on a substrate 1250 onto image sensor array 1033. Imaging light rays can be transmitted about imaging axis 25. Lens assembly 200 can be adapted to be capable of multiple focal lengths and multiple best focus distances. A combination of image sensor array 1033 and imaging lens assembly 200 can be regarded as an imaging assembly 1100.

Apparatus 1000 can also include an illumination pattern light source bank 1204 and associated light shaping optics 1205 for generating an illumination pattern 1260 substantially corresponding to a field of view 1240 of apparatus 1000. The combination of bank 1204 and optics 1205 can be regarded as an illumination assembly 1206 for projection of an illumination pattern 1260. Light source bank 1204 can be energized for projection of illumination pattern 1260. Apparatus 1000 can also include an aiming pattern light source bank 1208 and associated light shaping optics 1209 for generating an aiming pattern 1270 on substrate 1250. The combination of bank 1208 and optics 1209 can be regarded as an aiming assembly 1210 for projection of an aiming pattern 1270. In use, apparatus 1000 can be oriented by an operator with respect to a substrate 1250 bearing decodable indicia 15 in such manner that aiming pattern 1270 is projected on a decodable indicia 15. In the example of FIG. 1, decodable indicia 15 is provided by a 1D bar code symbol. Decodable indicia 15 could also be provided by a 2D bar code symbol or optical character recognition (OCR) characters. Each of illumination pattern light source bank 1204 and aiming pattern light source bank 1208 can include one or more light sources. In one embodiment, apparatus 1000 can be adapted so that illumination assembly 1206 can project light in a narrow wavelength band, e.g., a set of wavelengths in the red band (or green band, or blue band), and further so that apparatus 1000 includes a wavelength selective optical filter 2110 that filters light outside of the narrow wavelength band. Optical filter 2110 can be disposed in the optical receive path about above imaging axis 25.

Lens assembly 200 can be controlled with use of electrical power input unit 55 which provides energy for changing a plane of optimal focus of lens assembly 200. In one embodiment, an electrical power input unit 55 can operate as a controlled voltage source, and in another embodiment, as a controlled current source. Illumination pattern light source bank 1204 can be controlled with use of illumination pattern light source control circuit 1220. Aiming pattern light source bank 1208 can be controlled with use of aiming pattern light source bank control circuit 1222. Illumination pattern light source bank 1204 can comprise one or more light source. Aiming pattern light source bank 1208 can comprise one or more light source. The one or more light source of light source bank 1204 and/or light source bank 1208 can be provided by, e.g., one or more light emitting diode, LED.

Electrical power input unit 55 can apply signals for changing optical characteristics of lens assembly 200, e.g., for changing a focal length and/or a best focus distance of (a plane of optimum focus of) lens assembly 200. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a level of illumination output by aiming pattern light source bank 1208.

Apparatus 1000 can also include a number of peripheral devices including trigger 1120 which may be used to make active a trigger signal for activating frame readout and/or certain decoding processes. Apparatus 1000 can be adapted so that activation of trigger 1120 activates a trigger signal and initiates a decode attempt. Specifically, apparatus 1000 can be operative so that in response to activation of a trigger signal, a succession of frames can be read out and captured by way of read out of image signals from image sensor array 1033 (typically in the form of analog image signals) and then storage of image signals (in the form of digital image signals) after conversion into memory 1080 (which can buffer one or more of the succession of frames at a given time).

CPU 1060 can be operative to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1118 for coupling electrical power input unit 55 to system bus 1500, interface circuit 1218 for coupling illumination light source bank control circuit 1220 to system bus 1500, interface circuit 1224 for coupling aiming light source bank control circuit 1222 to system bus 1500, and interface circuit 1119 for coupling trigger 1120 to system bus 1500. Apparatus 1000 can also include a display 1122 coupled to system bus 1500 and in communication with CPU 1060, via interface 1121, as well as pointer mechanism 1124 in communication with CPU 1060 via interface 1123 connected to system bus 1500. Apparatus 1000 can also include keyboard 1126 in communication with CPU 1060 via interface 1125 connected to system bus 1500. Apparatus 1000 can also include range detector 1128 in communication with CPU 1060 via interface 1127 connected to system bus 1500. Range detector 1128 can be e.g., an ultrasonic range detector. Apparatus 1000 can also include a communication interface 1050 coupled to system bus 1500 and in communication with CPU 1060. Interface 1050 can be e.g., an Ethernet USB or IEEE 802.11 interface. Apparatus 1000 can be in TCP/IP communication with one or more external processor equipped apparatus.

Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

Figure 2:
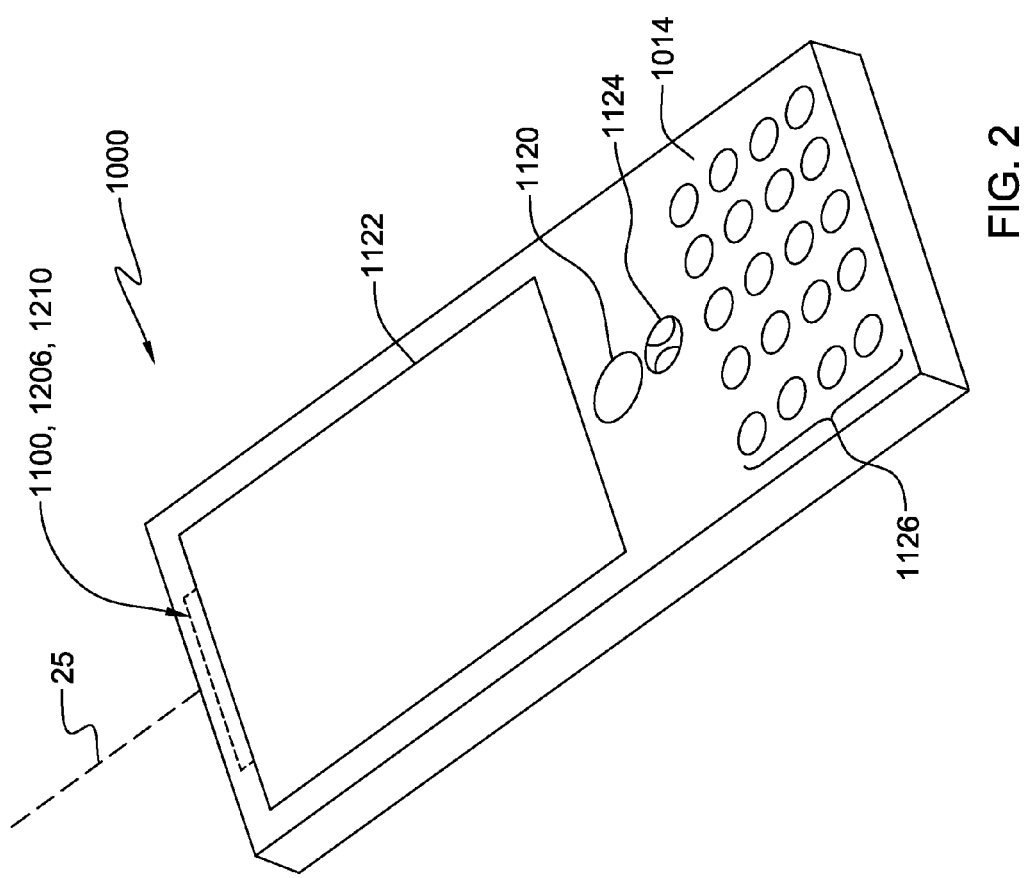
FIG. 2 is a physical form view illustrating an exemplary imaging apparatus.

A physical form view of apparatus 1000 in one embodiment is shown in FIG. 2. Trigger 1120, display 1122, pointer mechanism 1124, and keyboard 1126 can be disposed on a common side of a hand held housing 1014 as shown in FIG. 2. Display 1122 and trigger 1120 and pointer mechanism 1124 in combination can be regarded as a user interface of apparatus 1000. Display 1122 in one embodiment can incorporate a touch panel for navigation and virtual actuator selection a virtual trigger display in which case a user interface of apparatus 1000 can be provided by display 1122. A user interface of apparatus 1000 can also be provided by configuring apparatus 1000 to be operative to be reprogrammed by decoding of programming bar code symbols. A hand held housing 1014 for apparatus 1000 can in another embodiment be devoid of a display and can be in a gun style form factor. Imaging assembly 1100, illumination assembly 1206 and aiming assembly 1210 can be disposed in hand held housing 1014.

In one embodiment, there are a succession of frames exposed, read out, stored into memory 1080 and subject to processing by CPU 1060 during a time that trigger signal 5504 is active. The processing of each frame can include a decode attempt as described herein. As explained, a trigger signal 5504 can be made active by depression of trigger 1120 and can be de-activated by release of trigger 1120 or a successful decode or expiration of a timeout. A timing diagram illustrating operation of imaging apparatus 1000 is shown in FIG. 3.

Figure 3:
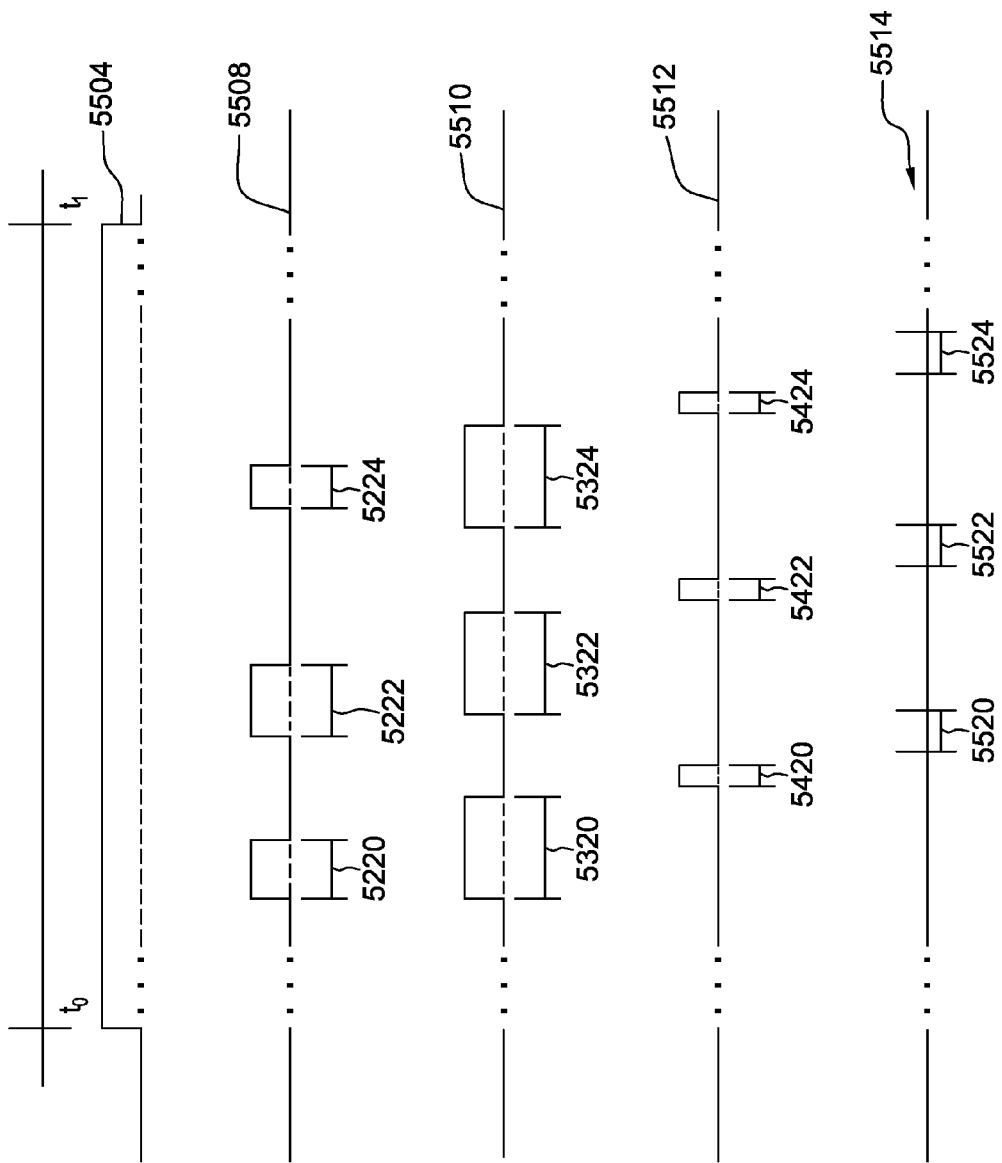
FIG. 3 is a timing diagram illustrating operation of an exemplary imaging apparatus.

Referring to the timing diagram of FIG. 3, signal 5504 is a trigger signal which can be made active by actuation of trigger 1120, and which can be deactivated by releasing of trigger 1120. A trigger signal may also become inactive after a time out period or after a successful decode of a decodable indicia. Signal 5510 is a frame exposure signal. Logic high periods of signal 5510 define frame exposure periods 5320, 5322, 5324. Signal 5512 is a read out signal. Logic high periods of signal 5512 define read out periods 5420, 5422, and 5424. Processing periods 5520, 5522, and 5524 can represent processing periods during which time CPU 1060 of apparatus 1000 processes stored (e.g., buffered) frames representing a substrate that can bear decodable indicia. Such processing can include processing for attempting to decode a decodable indicia as described herein.

With further reference to the timing diagram of FIG. 3, an operator at time, $t_0$, can activate trigger signal 5504 (e.g., by depression of trigger 1120). In response to trigger signal 5504 being activated, apparatus 1000 can expose a succession of frames. During each frame exposure period 5320, 5322, 5324, 5326 a frame of image data can be exposed.

Referring further to the timing diagram of FIG. 3, signal 5508 is a light pattern control signal. Logic high periods of signal 5508, namely periods 5220, 5222, 5224, 5226 define "on" periods for projected illumination pattern 1260. A light source bank 1204 of illumination assembly 1206 can be energized to project illumination pattern 1260 during illumination periods 5220, 5222, 5224 that overlap frame exposure periods 5320, 5322, 5324 so that at least a portion of an illumination period occurs during an associated frame exposure period and further that a portion of a frame exposure period occurs during an associated illumination period. Regarding illumination period 5220, illumination period 5220 commences at a time in common with commencement of frame exposure period 5320 and terminates at or prior to a termination time of a row exposure period for a certain row of pixels (certain row) of array 1033. The certain row of pixels can be a first row of pixels of array 1033. The certain row of pixels can be a first row of pixels of array 1033 subject to readout. Regarding illumination period 5222, illumination period 5222 commences prior to frame exposure period 5322 and terminates at or prior to a time of termination of a row exposure period of a certain row of array 1033. Regarding illumination period 5224, illumination period 5224 commences after an exposure commencement time of frame exposure period 5324 and terminates at a time at or prior to a termination time of a row exposure period for a certain row of array 1033. At time $t_1$, trigger signal 5504 can be deactivated e.g., responsively to a successful decode, a timeout condition being satisfied, or a release of trigger 1120. Regarding illumination periods 5220, 5222, 5224, the illustrated on times in one embodiment can be "continuously on" on times. The illustrated on times in another embodiment can be strobed on times wherein light source bank 1204 is turned on and off rapidly during an illumination period. Light source bank 1204 for a duration of an illumination period, e.g., period 5220, 5222, 5224 can be energized on and off at a strobing rate. In one embodiment, a strobing rate can be established so that there are two or more cycles per illumination period, which in one embodiment is less than or equal to 10.0 Hz. In another embodiment less than or equal to 8.0 Hz. In another embodiment less than or equal to 5.0 Hz. In another embodiment less than or equal to 4.0 Hz. In another embodiment less than or equal to 3.0 Hz. In another embodiment less than or equal to 2.0 Hz. In another embodiment less than or equal to 1.0 Hz. In another embodiment less than or equal to 0.5 Hz. In another embodiment less than or equal to 0.10 Hz. In one example a strobing rate is greater than 1.0 Hz e.g., 2.0 Hz. In one example a strobing rate is between 2.0 Hz and 4.0 KHz, e.g., 30.0 Hz. In one example a strobing rate is greater than or equal to 4.0 KHz, e.g., 4.0 Hz to 1000 KHz or more, e.g., to 10 MHz or more. In one specific embodiment, the strobing rate is between 20 KHz and 40 KHz. In one embodiment the strobing rate is 30 KHz.

Figure 4:
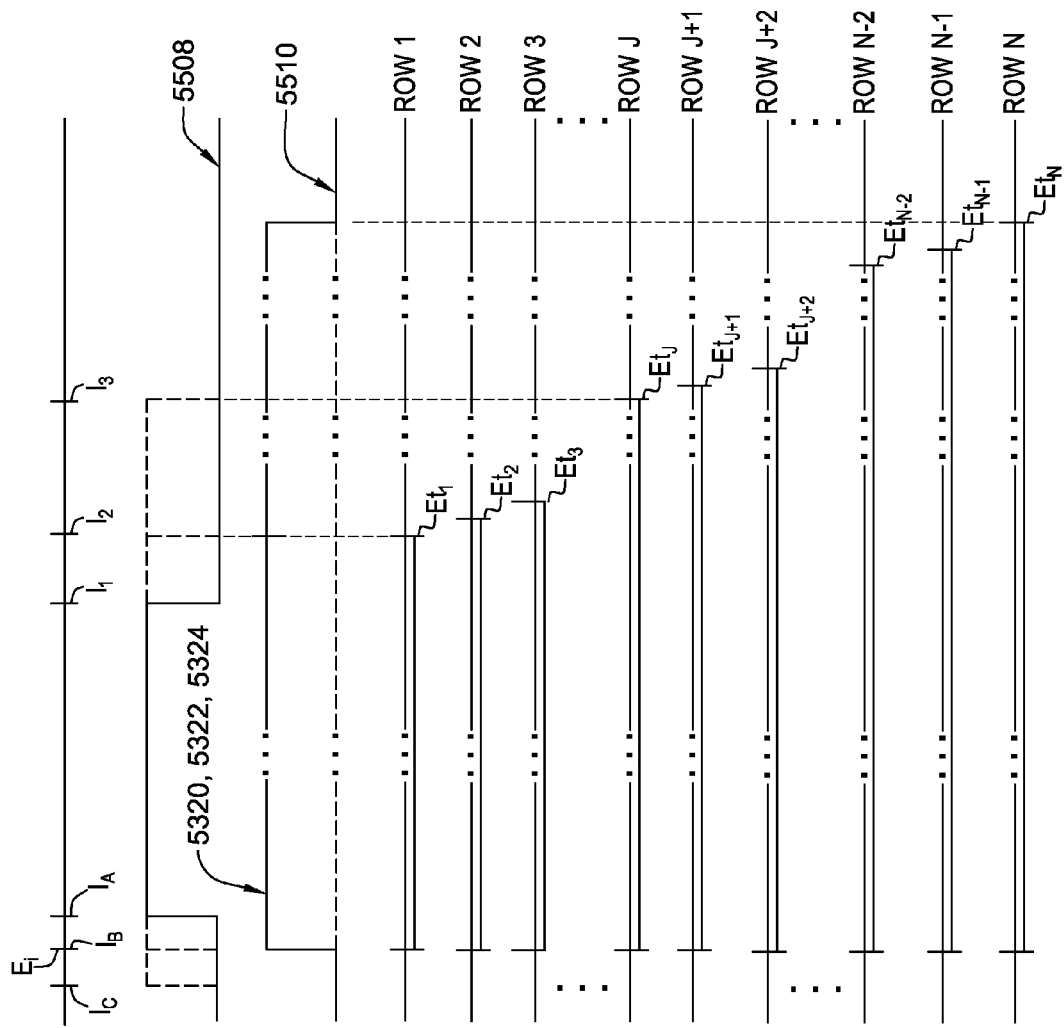
FIG. 4 is a timing diagram illustrating operation of an exemplary imaging apparatus.

Further description of a frame exposure period is set forth with reference to the timing diagram of FIG. 4. The frame exposure period labeled with three reference numerals 5320, 5322, 5324 indicated in FIG. 4 can be in accordance with any one of frame exposure periods 5320, 5322, 5324 and can have an associated illumination period as described in connection with any of frame exposure period 5220, 5222, 5224 as referenced in the timing diagram of FIG. 3. Exposure of each row of image sensor array 1033 can commence at a common initiation time $E_i$ and each row of image sensor array 1033 can have a different exposure termination time. In the example as shown in FIG. 4 each row of image sensor array 1033 can have an exposure termination time that is sequential to the exposure termination time of the preceding row. For example, row 1 of array 1033 can have an exposure termination time at time $Et_1$, row 2 can have and exposure termination time at time $Et_2$ after time $Et_1$ and row 3 of array 1033 can have an exposure termination time at time $Et_3$ after time $Et_2$. In the timing diagram of FIG. 4 timelines labeled Row 1, Row 2, and Row 3 illustrate row exposure periods for the first three rows of an M column and N row (M×N) image sensor array, timelines labeled Row J, Row J+1, Row J+2 illustrate row exposure periods for middle rows Row J, Row J+1, Row J+2 of image sensor array 1033 and timelines labeled Row N−2, Row N−1, and Row N illustrate row exposure periods for the last three rows, Row N−2, Row N−1, Row N of image sensor array 1033, having an M+N array of pixels.

In connection with FIG. 3 it was described that an illumination period start time can be before (period 5222) at (period 5220) or after (period 5224) a frame exposure start time. In connection with the timing diagram of FIG. 3 in reference to signal 5508 it was described that a termination time of illumination period e.g., illumination period 5220, 5222, 5224 can be at various times within a frame exposure period e.g., period 5220, 5222, 5224. In connection with the timing diagram of FIG. 4, there is shown signal 5508 having on and off (energization and de-energization times) that define an illumination period. The illumination period is shown as having a certain start time and termination time (solid lines). However, it is described that the start time and termination time can be varied as indicated by the dashed lines shown in association with signal 5508. Regarding exemplary illumination period termination time $I_1$, illumination period termination time $I_1$ illustrates that an illumination period can terminate prior to a time that a row exposure period for first row, Row 1 ends. Regarding exemplary illumination period termination time $I_2$, illumination period termination time $I_2$ illustrates that an illumination period can terminate at a time in common with a time that a row exposure period for row 1. Regarding exemplary illumination period termination time $I_3$, illumination period termination time $I_3$ illustrates that an illumination period can terminate at time after time $I_2$. It can be useful to control apparatus 1000 so that an illuminaton period terminates at time $I_3$ where a first row of image sensor array 1033 subject to readout is not Row 1, but a row of array 1033 after Row 1. For example, if a frame subject to readout is a windowed frame and a first row of image sensor array 1033 subject to readout is Row J it can be useful to terminate illumination period at time $I_3$, a time at or before an exposure period termination time for Row J. Regarding exemplary illumination start time $I_A$, exemplary illumination start time $I_A$ indicates that an illumination period can commence subsequent to a commencement of a frame exposure period. Regarding exemplary illumination start time $I_B$, exemplary illumination start time $I_B$ indicates that an illumination period can commence at a time in common with a frame exposure commencement time. Regarding exemplary illumination start time $I_C$, exemplary illumination start time $I_C$ illustrates that an illumination period can commence prior to commencement of a frame exposure period.

By controlling an illumination period so that an illumination period terminates at or prior to an exposure period termination time for a first row of image sensor array 1033 subject to readout of a frame having image data representing light incident on array 1033 during a frame exposure period, a quality of a captured frame of image data can be improved. For example, image blurring problems caused by movement between an apparatus 1000 and a target 1250 during frame exposure can be reduced to improve a motion tolerance of apparatus 1000.

A quality of a captured frame can be improved further by adapting apparatus 1000 to filter out light of a certain wavelength band. In one embodiment, as set forth in connection with FIG. 1, apparatus 1000 can be adapted so that illumination assembly 1206 projects light forming illumination pattern 1260 in a certain narrow wavelength band and further so that apparatus 1000 includes an optical filter 210 in a receive optical path that filters light outside of the certain narrow wavelength band. In such manner, an amount of light incident on image sensor array 1033 originating external to illumination assembly 1206 (i.e., ambient light) is reduced resulting in a reduction of motion blur artifacts attributed to sequential exposure period termination times.

For further reduction of a ratio of ambient light to light emitted by illumination assembly 1206, and further reduction of motion artifacts, an amplitude of light emitted by illumination assembly 1206 can be increased. In one embodiment, illumination light source bank control circuit 1220 is a "flash" circuit configured to overdrive the one or more light source of bank 1204 above their maximum continuous operation rating. Illumination light source bank control circuit 1220 can include a boost capacitor that stores energy for quick discharge to energize the one or more light source of light source bank 1204. In one embodiment, the light source(s) of light source bank 1204 can be overdriven to 200% or more of their maximum continuous current rating; in another embodiment, 300% or more; in another embodiment 400% or more; in another embodiment 1000% or more. In one embodiment, light source bank 1204 comprises one or more LED.

For further reduction of a ratio of ambient light to light emitted by illumination assembly 1206, and corresponding reduction of motion artifacts imaging lens assembly 2000 can be provided to include an F# of greater than a certain value. In one embodiment, the F# is greater than or equal to 5.0. In one embodiment, the F# is greater than or equal to 6.0. In one embodiment the F# is greater than or equal to 7.0. In one embodiment, the F# is greater than or equal to 8.0. In one embodiment, the F# is greater than or equal to 9.0. In one embodiment, the F# is greater than or equal to 10.0. In one embodiment, the F# is greater than or equal to 15.0. In one embodiment, the F# is greater than or equal to 20.0.

A small sample of systems, methods and apparatus that are described herein is as follows:

A1. An imaging apparatus comprising:
an imaging assembly having an image sensor array and a lens assembly for focusing an image onto the image sensor array, the image sensor array comprising a plurality of pixels arranged in a plurality of rows and columns and pixels, the imaging assembly defining a field of view;
an illumination assembly for projecting an illumination pattern during an illumination period, wherein at least a portion of the illumination pattern is projected in an area within the field of view;
wherein pixels of the image sensor array are exposed during a frame exposure period in which a certain subsequent and further subsequent row of pixels of the image sensor array have common row exposure initiation times and respectively sequential exposure termination times;
wherein the imaging apparatus is operative to process for attempting to decode decodable indicia image data representative of light incident on the image sensor array during the frame exposure period;
wherein the illumination period and the frame exposure period are coordinated so that at least a portion of the illumination period occurs during the frame exposure period and further so that the illumination period ends at a time in common with or earlier than an exposure termination time of the certain row.

A2. The imaging apparatus of claim A1, wherein light forming the illumination pattern is light within a certain narrow wavelength band and wherein the apparatus includes a wavelength selective filter filtering light outside of the certain narrow wavelength band.

A3. The imaging apparatus of claim A1, wherein light forming the illumination pattern is light within a certain narrow wavelength band and wherein the apparatus includes a wavelength selective filter filtering light outside of the certain narrow wavelength band, and wherein the lens assembly includes an F# greater than or equal to 5.0.

A4. The imaging apparatus of claim A1, wherein the certain row is the first row of the image sensor array.

A5. The imaging apparatus of claim A1, wherein the certain row is a first row of the image sensor array subject to readout for capture of a frame of image data representing light incident on the image sensor array during the frame exposure period.

A6. The imaging apparatus of claim A1, wherein the certain row and the subsequent row are successive rows.

A7. The imaging apparatus of claim A1, wherein the imaging apparatus includes a hand held housing in which the image sensor array is disposed.

A8. The imaging apparatus of claim A6, wherein the certain row is the first row of the image sensor array subject to readout of a frame of image data representing light incident on the image sensor array during the frame exposure period.

A9. The imaging apparatus of claim A7, wherein the illumination period and the frame exposure period are coordinated so that the illumination period ends at a time in common with the exposure termination time of the certain row.

A10. The imaging apparatus of claim A7, wherein the illumination period and the frame exposure period are coordinated so that the illumination period ends at a time earlier than an exposure termination time of the certain row.

A11. The imaging apparatus of claim A1, wherein the illumination period and the frame exposure period are coordinated so that the illumination period ends at a time in common with the exposure termination time of the certain row.

A12. The imaging apparatus of claim A1, wherein the illumination period and the frame exposure period are coordinated so that the illumination period ends at a time earlier than an exposure termination time of the certain row.

A13. The imaging apparatus of claim A1, wherein the illumination period commences prior to the common exposure initiation time of the certain subsequent and further subsequent rows of the image sensor array.

A14. The imaging apparatus of claim A1, wherein the illumination period commences at a time in common with the common exposure initiation time of the certain subsequent and further subsequent rows of the image sensor array.

A15. The imaging apparatus of claim A1, wherein the illumination period commences subsequent to the common exposure initiation time of the certain subsequent and further subsequent rows of the image sensor array.

A16. The imaging apparatus of claim A1, wherein the illumination assembly is controlled to strobe light forming the illumination pattern during the illumination period.

A17. The imaging apparatus of claim A1, wherein the lens assembly includes an F# greater than or equal to 5.0.

A18. The imaging apparatus of claim A1, wherein the lens assembly includes an F# greater than or equal to 9.0.

A19. The imaging apparatus of claim A1, wherein the apparatus overdrives a light source of the illumination assembly during the illumination period.

A20. The imaging apparatus of claim A3, wherein the apparatus overdrives a light source of the illumination assembly during the illumination period.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

We claim:

1. An imaging apparatus comprising:
an imaging assembly having an image sensor array and a lens assembly for focusing an image onto the image sensor array, the image sensor array comprising pixels arranged in a plurality of rows and columns of pixels, the imaging assembly defining a field of view;
an illumination assembly for projecting an illumination pattern during an illumination period, wherein at least a portion of the illumination pattern is projected in an area within the field of view;
wherein a plurality of pixels of the image sensor array, the plurality of pixels comprising a certain row, are exposed during a frame exposure period in which each row of the plurality of pixels has a common row exposure initiation time and a different, sequential exposure termination time;
wherein the imaging apparatus is operative to process for attempting to decode decodable indicia image data representative of light incident on the image sensor array during the frame exposure period; and
wherein the illumination period and the frame exposure period are coordinated so that at least a portion of the illumination period occurs during the frame exposure period and further so that the illumination period ends at a time in common with or earlier than an exposure termination time of the certain row.

2. The imaging apparatus of claim 1, wherein light forming the illumination pattern is light within a certain narrow wavelength band and wherein the apparatus includes a wavelength selective filter filtering light outside of the certain narrow wavelength band.

3. The imaging apparatus of claim 1, wherein light forming the illumination pattern is light within a certain narrow wavelength band and wherein the apparatus includes a wavelength selective filter filtering light outside of the certain narrow wavelength band, and wherein the lens assembly includes an F# greater than or equal to 5.0.

4. The imaging apparatus of claim 3, wherein the apparatus overdrives a light source of the illumination assembly during the illumination period.

5. The imaging apparatus of claim 1, wherein the certain row is the first row of the image sensor array.

6. The imaging apparatus of claim 1, wherein the certain row is a first row of the image sensor array subject to readout for capture of a frame of image data representing light incident on the image sensor array during the frame exposure period.

7. The imaging apparatus of claim 1, wherein the certain row and the subsequent row are successive rows.

8. The imaging apparatus of claim 7, wherein the certain row is the first row of the image sensor array subject to readout of a frame of image data representing light incident on the image sensor array during the frame exposure period.

9. The imaging apparatus of claim 1, wherein the imaging apparatus includes a hand held housing in which the image sensor array is disposed.

10. The imaging apparatus of claim 9, wherein the illumination period and the frame exposure period are coordinated so that the illumination period ends at a time in common with the exposure termination time of the certain row.

11. The imaging apparatus of claim 9, wherein the illumination period and the frame exposure period are coordinated so that the illumination period ends at a time earlier than an exposure termination time of the certain row.

12. The imaging apparatus of claim 1, wherein the illumination period and the frame exposure period are coordinated so that the illumination period ends at a time in common with the exposure termination time of the certain row.

13. The imaging apparatus of claim 1, wherein the illumination period and the frame exposure period are coordinated so that the illumination period ends at a time earlier than an exposure termination time of the certain row.

14. The imaging apparatus of claim 1, wherein the illumination period commences prior to the common exposure initiation time of the certain subsequent and further subsequent rows of the image sensor array.

15. The imaging apparatus of claim 1, wherein the illumination period commences at a time in common with the common exposure initiation time of the certain subsequent and further subsequent rows of the image sensor array.

16. The imaging apparatus of claim 1, wherein the illumination period commences subsequent to the common exposure initiation time of the certain subsequent and further subsequent rows of the image sensor array.

17. The imaging apparatus of claim 1, wherein the illumination assembly is controlled to strobe light forming the illumination pattern during the illumination period.

18. The imaging apparatus of claim 1, wherein the lens assembly includes an F# greater than or equal to 5.0.

19. The imaging apparatus of claim 1, wherein the lens assembly includes an F# greater than or equal to 9.0.

20. The imaging apparatus of claim 1, wherein the apparatus overdrives a light source of the illumination assembly during the illumination period.

* * * * *